Figure 1:
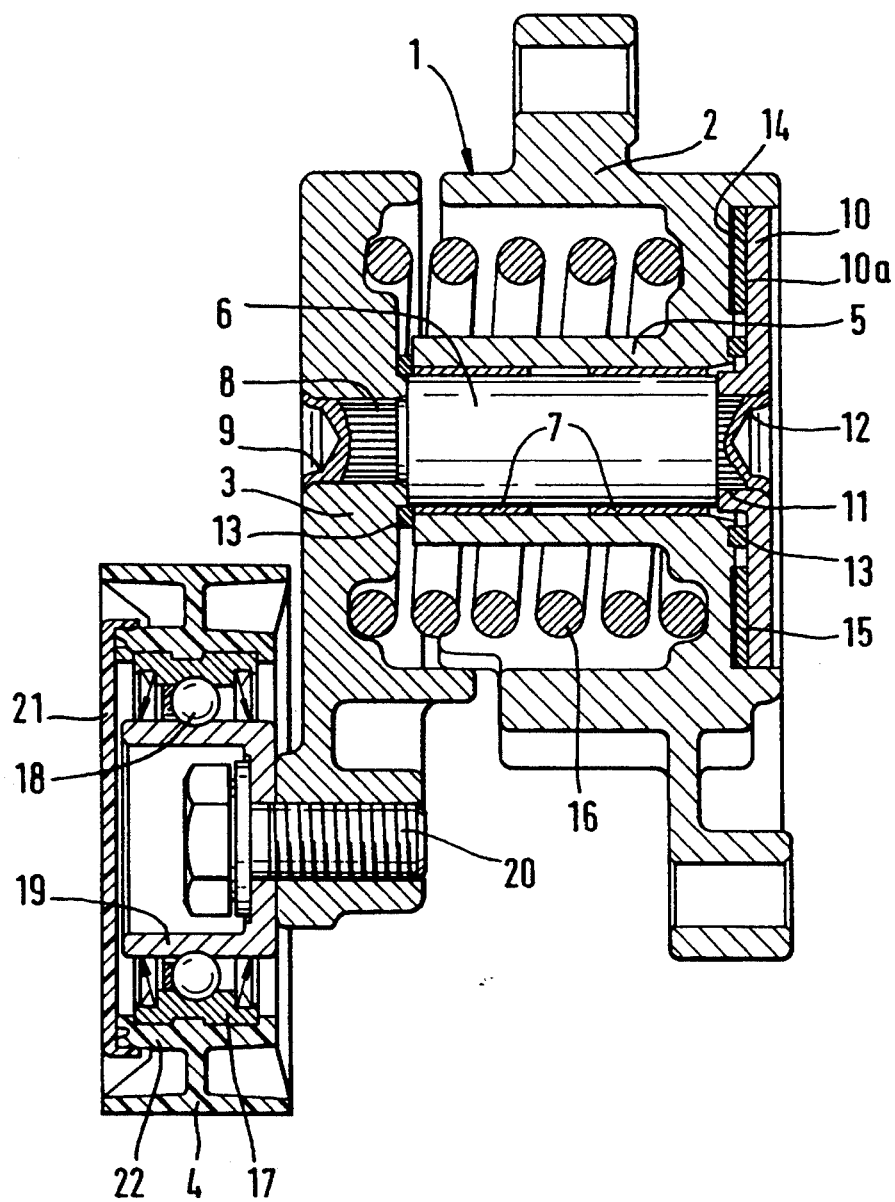

United States Patent [19]

Schmidt et al.

[11] Patent Number: 5,449,328
[45] Date of Patent: Sep. 12, 1995

[54] TENSIONING DEVICE FOR BELT OR CHAIN DRIVES

[75] Inventors: Werner Schmidt; Ingo Sebastian; Hanns Seegers, all of Herzogenaurach; Michael Schmid, Hochstadt; Rudolf Polster, Baiersdorf, all of Germany

[73] Assignee: INA Walzlager Schaeffler KG, Germany

[21] Appl. No.: 324,773

[22] Filed: Oct. 17, 1994

[30] Foreign Application Priority Data

Dec. 18, 1993 [DE] Germany .................. 43 43 429.0

[51] Int. Cl.[6] .................................................. F16H 7/08
[52] U.S. Cl. .................................................. 474/135
[58] Field of Search ........ 474/101, 109, 111, 113–117, 474/133–138

[56] References Cited

U.S. PATENT DOCUMENTS 4,938,734  7/1990  Green et al. ................. 474/135
5,149,306  9/1992  Sidwell et al. ................. 474/135

*Primary Examiner*—Michael Powell Buiz
*Attorney, Agent, or Firm*—Bierman and Muserlian

[57] ABSTRACT

A tensioning device (1) for belt or chain drives comprising a tension arm (3) which carries a tension roller (4) on one end and is mounted at a second end for rotating together with a shaft (6) in a housing (2) while being resiliently supported on the housing (2) by a torsion spring (16), the tensioning device (1) further comprising a friction disk (10) which is rigidly connected to the shaft (6) or the tension arm (3), a friction lining (15,24,27) being arranged between a friction surface (10a) of the friction disk (10) and an axial contact surface (14) of the housing (2), characterized in that the contact surface (14) comprises a means (23,25,28) which engages the friction lining (15,24,27) by positive and/or force engagement and prevents any rotation of said friction lining (15,24,27) with respect to the contact surface (14).

6 Claims, 3 Drawing Sheets

TENSIONING DEVICE FOR BELT OR CHAIN DRIVES

STATE OF THE ART

A tensioning device for belt or chain drives comprising a tension arm which carries a tension roller on one end and is mounted at a second end for rotating together with a shaft in a housing while being resiliently supported on the housing by a torsion spring, the tensioning device further comprising a friction disk which is rigidly connected to the shaft or the tension arm, a friction lining being arranged between a friction surface of the friction disk and an axial contact surface of the housing is known from DE-A-41 24 636. In such mechanical belt tensioners which are preferably used in drives of auxiliary units of internal combustion engines, a damping of the movements of the tension arm is obtained by friction between the friction lining and the friction disk or between the friction lining and the contact surface. While the friction disk is made of steel, the housing of the tension device, for manufacturing reasons and to save weight, is normally made of injection molded aluminum. Since the coefficient of friction of the friction pairing between the friction lining and the contact surface made of aluminum is lower than that of the friction pairing between the friction lining and the friction disk, not only are the damping characteristics of the tensioner unfavorably altered but the constant chafing between the friction lining and the contact surface leads to a wear of this contact surface.

OBJECTS OF THE INVENTION

It is an object of the invention to avoid these disadvantages and to create a frictional damping for the tensioning device in which only the friction disk and the friction lining cooperate with each other as damping elements.

This and other objects and advantages of the invention will become obvious from the following detailed description.

THE INVENTION

The novel tensioning device of the invention for belt or chain drives comprising a tension arm (3) which carries a tension roller (4) on one end and is mounted at a second end for rotating together with a shaft (6) in a housing (2) while being resiliently supported on the housing (2) by a torsion spring (16), the tensioning device (1) further comprising a friction disk (10) which is rigidly connected to the shaft (6) or the tension arm (3), a friction lining (15,24,27) being arranged between a friction surface (10a) of the friction disk (10) and an axial contact surface (14) of the housing (2), is characterized in that the contact surface (14) comprises a means (23,25,28) which engages the friction lining (15,24,27) by positive and/or force engagement and prevents any rotation of said friction lining (15,24,27) with respect to the contact surface (14).

The object of the invention is achieved in the case of a tensioning device of the initially cited type by the fact the contact surface is provided with a means which engages the friction lining by a positive and/or force engagement and prevents any rotation of the friction lining with respect to the contact surface. This means fixes the friction lining in a pre-determined position on the contact surface so that friction can take place only between the friction disk and the friction lining. Thus, a wear of the contact surface of the housing is avoided.

In a further development of the invention, the contact surface comprises on at least parts thereof, sharp-edged axially extending projections which dig into the friction disk under axial pressure. These sharp-edged projections, which can have a variety of shapes, penetrate the surface of the friction disk, thus fixing the friction disk positionally in the housing, particularly in the circumferential direction. Such a fixing method for a friction lining on a contact surface is equally suitable for the fixing of linings in other cases, for example in clutches and brake systems.

The projections may have a pyramidal shape in which case the contact surface has a waffle-type structure which can be readily made in the injection molding process of the housing. Several other configurations for fixing the friction lining against rotation on the contact surface are conceivable. For example, there can be provided on the surface of the friction lining facing the contact surface, at least one recess into which corresponding projections formed on the contact surface engage in the installed state. These projections can be constituted by fixing pins which engage into corresponding bores provided in the friction lining.

Further, the friction lining may comprise at least one radial projection or one radial recess which cooperates with a recess or a projection of the housing. The friction lining in this case can be configured similar to friction linings used in multi-plated clutches. Finally, a granular wear-resistant material may be embedded in the contact surface so as to project axially therefrom and thus assure a fixing of the friction lining against rotation on the housing.

BRIEF DESCRIPTION OF THE

Figure 2:
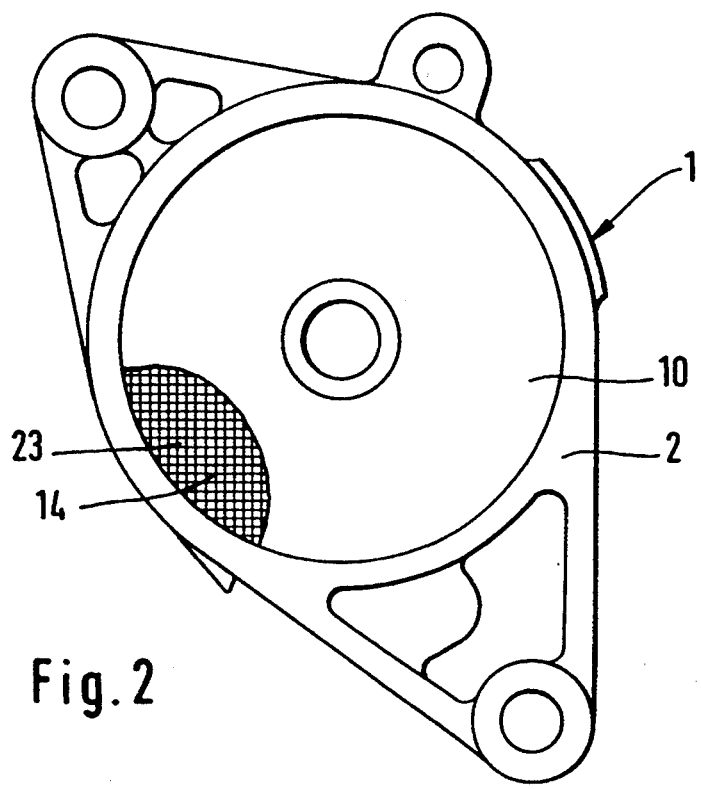
Figure 3:
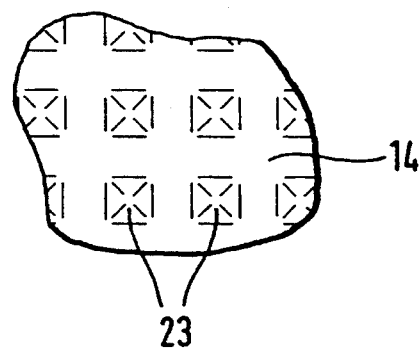
Figure 4:
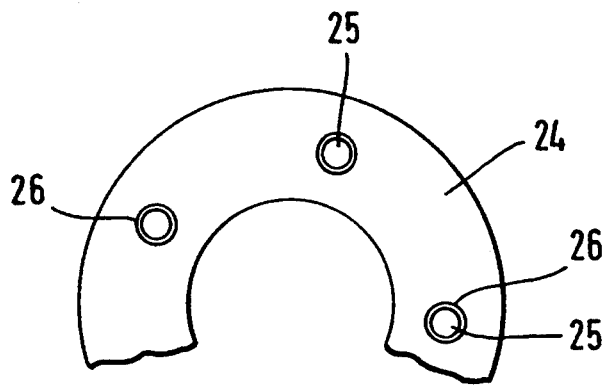
Figure 5:
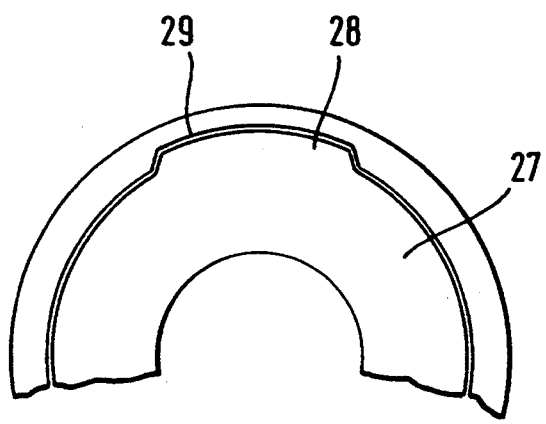

FIG. 1 is a longitudinal cross-section of a belt tensioning device of the invention, FIG. 2 is an end view of the belt tensioning device of FIG. 1 showing the friction disk partly cut out, FIG. 3 is a detail of a contact surface of a housing of the tensioning device, FIG. 4 is a partial view of a friction disk which is fixed by means of axially extending projections of the contact surface, and FIG. 5 is a partial view of the friction set-up in which the friction lining is fixed in the housing by means of radial projections.

FIG. 1 shows a tensioning device, referenced at 1, essentially comprising a housing 2, a tension arm 3 and a tension roller 4. The housing is cup-shaped and comprises in its interior a concentric hub 5 in which a shaft 6, rigidly connected to the roller arm 3, is rotatably mounted in a slide bearing 7. The non-rotatable connection between the roller arm 3 and the shaft 6 is established with the help of a toothing 8, the roller arm 3 being fixed in the axial direction on the shaft 6 by a swaging 9. At its end away from the roller arm 3, the shaft 6 receives a friction disk 10 which is rigidly connected to the shaft 6 by a further toothing 11 and a swaging 12.

To prevent dirt from entering into the slide bearing 7, sealing rings 13 are arranged on both ends thereof, i.e. between the housing 2 and the tension arm 3 and between the housing 2 and the friction disk 10. On one front end of the housing 2, there is formed a contact surface 14 facing the friction disk 10, and a friction lining 15 is disposed between this contact surface 14 and a friction surface 10a of the friction disk 10. Special features of this friction lining 15 will be dealt with in connection with FIGS. 2 to 5.

Further, the tension arm 3 is urged towards a driving means, i.e. a belt or a chain, not shown, by a coil spring 16 acting as a torsion spring. This coil spring 16 is lodged inside the cup-shaped housing 2 and is fixed at its two ends on the tension arm 3 and the housing 2, respectively. The tension roller 4 is a plastic element and is arranged on the outer ring 17 of a rolling bearing 18 which is sealed at both ends. The rolling bearing 18 comprises a pot-shaped inner element 19 which can be made as a deep-drawn sheet metal part and connected to the tension arm 3 by a screw 20. The rolling bearing 18 is covered with a protecting cap 21 which is snapped onto an inner hub element 22 of the tension roller 4.

FIG. 2 is an end view of the friction disk-end of the tensioning device 1 in which the friction disk 10 and the friction lining 15 have been partly cut out to show a waffle-type surface structure of the contact surface 14 of the invention. This contact surface 14 comprises axially extending pointed projections 23 in the shape of pyramids (cf. also FIG. 3). These axial pyramid-shaped projections 23 dig into the friction lining 15 when this has been disposed between the friction disk 10 and the contact surface 14 and thus fix the friction lining 15 in the housing 2 against rotation. Therefore, the friction required for damping the movements of the tension arm 3 takes place only between the friction disk 10 made of steel and the friction lining 15. Thus, the entire housing 2, including the contact surface 14, can be made of a light metal, preferably aluminum, without wear occurring at the contact surface 14 or the damping properties of the tensioning device being altered.

FIG. 3 shows a detail of a contact surface of the invention likewise comprising pyramid-shaped projections 23 which, however, are arranged at greater distances to one another in comparison with the embodiment of FIG. 2. This type of surface structure can likewise be obtained in a simple manufacturing process.

FIG. 4 shows a further variant for fixing a friction disk 24 in the housing 2. In this embodiment, the contact surface 14 of FIG. 1 comprises axial projections in the form of fixing pins 25 which engage into bores 26 made in the friction lining 24. According to FIG. 5, the friction lining 27 comprises at least one radial projection 28 which engages into a radial recess 29 of the housing 2. The embodiments of FIGS. 4 and 5 are likewise of an easy-to-manufacture structure.

Various other modifications of the tensioning device of the invention may be made without departing from the spirit or scope thereof and it is to be understood that the invention is intended to be limited only as defined in the appended claims.

What we claim is:

1. A tensioning device (1) for belt or chain drives comprising a tension arm (3) which carries a tension roller (4) on one end and is mounted at a second end for rotating together with a shaft (6) in a housing (2) while being resiliently supported on the housing (2) by a torsion spring (16), the tensioning device (1) further comprising a friction disk (10) which is rigidly connected to the shaft (6) or the tension arm (3), a friction lining (15,24,27) being arranged between a friction surface (10a) of the friction disk (10) and an axial contact surface (14) of the housing (2), characterized in that the contact surface (14) comprises a means (23,25,28) which engages the friction lining (15,24,27) by positive and/or force engagement and prevents any rotation of said friction lining (15,24,27) with respect to the contact surface (14).

2. A tensioning device of claim 1, wherein the contact surface (14) comprises on at least parts thereof sharp-edged axially extending projections (23) which dig into the friction lining (15) under axial pressure.

3. A tensioning device of claim 2 wherein the projections (23) are made in the shape of pyramids.

4. A tensioning device of claim 1 wherein a surface of the friction lining (24) facing the contact surface (14) comprises at least one recess (26) into which corresponding projections (25) formed on the contact surface (14) engage.

5. A tensioning device of claim 1 wherein the friction lining (27) comprises at least one radial projection (28) or one radial recess which cooperates with a recess (29) or a projection of the housing (2).

6. A tensioning device of claim 1 wherein a granular wear-resistant material is embedded in the contact surface (14) so as to project axially therefrom.

* * * * *